US012625528B2

(12) United States Patent
Chang et al.

(10) Patent No.: US 12,625,528 B2
(45) Date of Patent: May 12, 2026

(54) COUPLE FED CORNER FRAME ANTENNA IN AN INFORMATION HANDLING SYSTEM

(71) Applicant: DELL PRODUCTS L.P., Round Rock, TX (US)

(72) Inventors: Ching Wei Chang, Cedar Park, TX (US); Changsoo Kim, Cedar Park, TX (US); Tze-Hsuan Chang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 199 days.

(21) Appl. No.: 18/644,355

(22) Filed: Apr. 24, 2024

(65) Prior Publication Data

US 2025/0335008 A1      Oct. 30, 2025

(51) Int. Cl.
| | |
|---|---|
| *G06F 1/16* | (2006.01) |
| *H01Q 1/22* | (2006.01) |
| *H01Q 1/48* | (2006.01) |
| *H01Q 13/18* | (2006.01) |

(52) U.S. Cl.
CPC .......... *G06F 1/1698* (2013.01); *G06F 1/1616* (2013.01); *G06F 1/1683* (2013.01); *H01Q 1/2266* (2013.01); *H01Q 1/48* (2013.01); *H01Q 13/18* (2013.01)

(58) Field of Classification Search
CPC ........ H01Q 1/2266; H01Q 1/48; H01Q 13/18; G06F 1/1681; G06F 1/1698
See application file for complete search history.

(56) References Cited

U.S. PATENT DOCUMENTS

| | | | | |
|---|---|---|---|---|
| 5,966,098 A * | 10/1999 | Qi | ......................... | H01Q 1/2266 |
| | | | | 343/822 |
| 6,339,400 B1 * | 1/2002 | Flint | .................... | H01Q 1/2266 |
| | | | | 343/702 |
| 7,012,571 B1 * | 3/2006 | Ozkar | .................... | H01Q 1/243 |
| | | | | 343/702 |
| 7,042,404 B2 * | 5/2006 | Jo | ........................... | H01Q 1/243 |
| | | | | 343/702 |
| 8,270,914 B2 * | 9/2012 | Pascolini | ................. | H01Q 7/00 |
| | | | | 343/702 |
| 9,203,139 B2 * | 12/2015 | Zhu | ......................... | H01Q 1/243 |
| 9,857,846 B2 * | 1/2018 | Lockwood | ............ | G06F 1/1669 |
| 11,211,686 B2 | 12/2021 | Ramasamy et al. | | |
| 2002/0135521 A1 * | 9/2002 | Moore | ................. | H01Q 9/0421 |
| | | | | 343/702 |
| 2002/0190905 A1 * | 12/2002 | Flint | .................... | H01Q 1/2266 |
| | | | | 343/702 |

(Continued)

OTHER PUBLICATIONS

Nayak, Peshal B., A Novel Triple Band Antenna Design for Bluetooth, WLAN and WiMax Applications (Year: 2020).*

*Primary Examiner* — Adrian S Wilson
(74) *Attorney, Agent, or Firm* — Larson Newman, LLP

(57) ABSTRACT

An information handling system includes a cover, a hinge, and an antenna holder. The cover includes a parasitic resonator that is configured to resonate at lower frequencies of a wireless fidelity frequency range. The hinge in physical communication with the cover. The hinge is connected at a corner of the cover. The antenna holder in physical communication with the hinge, the antenna holder including a resonator antenna. The resonator antenna is configured to resonate at higher frequencies of the wireless fidelity frequency range.

20 Claims, 6 Drawing Sheets

(56) References Cited

U.S. PATENT DOCUMENTS

| | | | |
|---|---|---|---|
| 2004/0135730 A1* | 7/2004 | Yang | H01Q 21/28 |
| | | | 343/702 |
| 2004/0160371 A1* | 8/2004 | Hirota | G06F 1/1616 |
| | | | 343/702 |
| 2005/0054399 A1* | 3/2005 | Buris | H01Q 19/10 |
| | | | 455/575.1 |
| 2005/0146475 A1* | 7/2005 | Bettner | G06F 1/1616 |
| | | | 343/702 |
| 2006/0061512 A1* | 3/2006 | Asano | H01Q 9/42 |
| | | | 343/702 |
| 2011/0241948 A1* | 10/2011 | Bevelacqua | H01Q 13/18 |
| | | | 343/702 |
| 2016/0118712 A1* | 4/2016 | Gu | H05K 5/04 |
| | | | 343/702 |
| 2017/0142241 A1* | 5/2017 | Kim | H04M 1/026 |
| 2018/0287241 A1* | 10/2018 | Kumar | G06F 1/1698 |
| 2019/0363422 A1 | 11/2019 | Bologna et al. | |
| 2022/0244760 A1* | 8/2022 | Morrison | H04M 1/0268 |
| 2024/0302872 A1* | 9/2024 | Lombardi | G06F 1/1698 |

* cited by examiner

COUPLE FED CORNER FRAME ANTENNA IN AN INFORMATION HANDLING SYSTEM

FIELD OF THE DISCLOSURE

The present disclosure generally relates to information handling systems, and more particularly relates to a couple fed corner frame antenna in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a cover, a hinge, and an antenna holder. The cover includes a parasitic resonator that is configured to resonate at lower frequencies of a wireless fidelity frequency range. The hinge in physical communication with the cover. The hinge is connected at a corner of the cover. The antenna holder in physical communication with the hinge, the antenna holder including a resonator antenna. The resonator antenna is configured to resonate at higher frequencies of the wireless fidelity frequency range.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
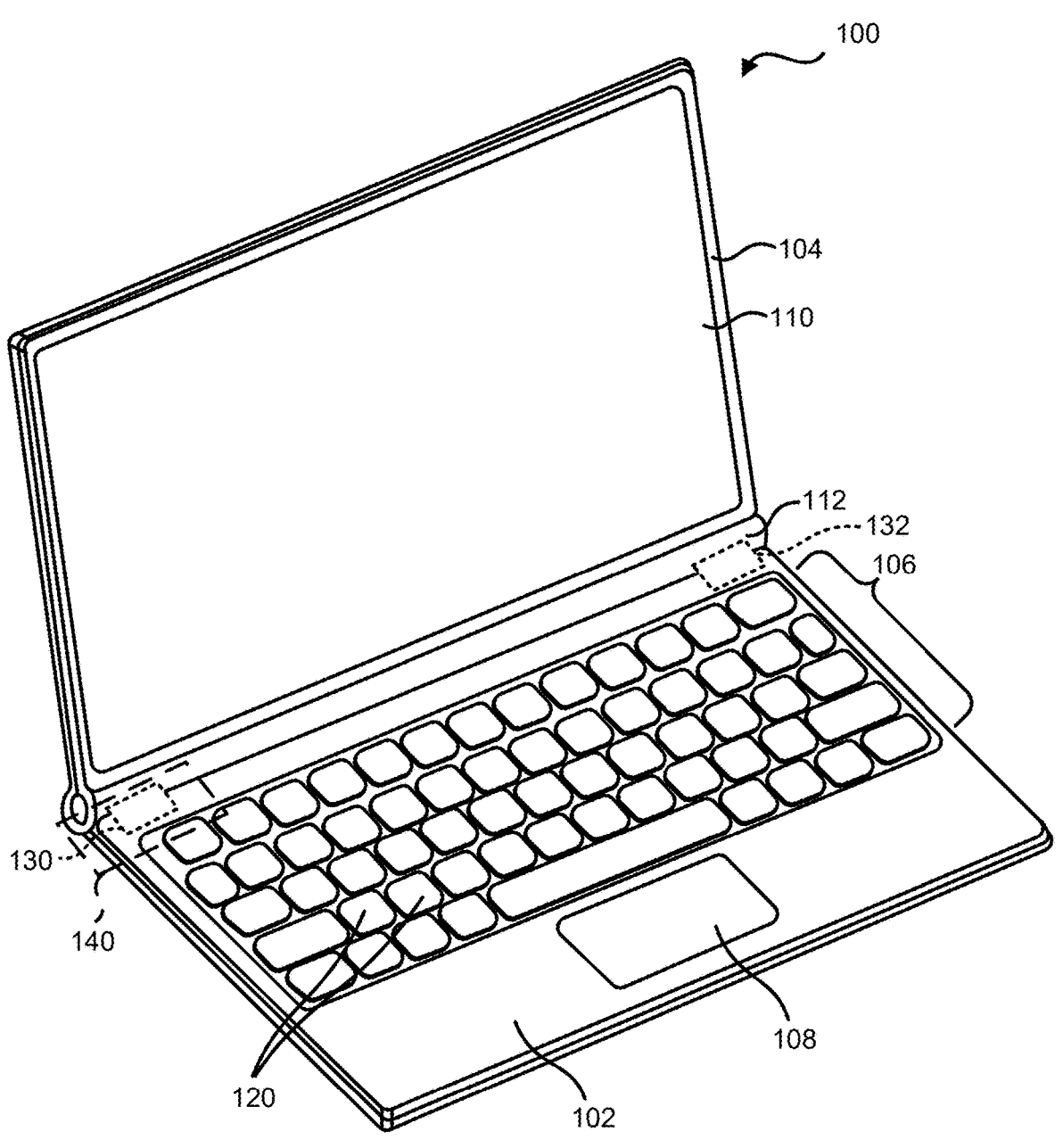
FIG. 1 is a perspective view of an information handling system according to at least one embodiment of the present disclosure.

FIG. 1 illustrates an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Keyboard 106 includes multiple keys 120. Information handling system 100 also includes antenna assemblies 130 and 132. In certain examples, antenna assembly 130 may be located in one outer corner near the hinge of mechanism 112 and antenna assembly 132 may be located in an opposite outer corner neat another hinge of the mechanism. In an example, one of antenna assemblies 130 and 132 may be the main antenna and the other antenna may be an auxiliary antenna for information handling system 100.

When the information handling system 100 comprises a 2-in-1 device, mechanism 112 may enable the top portion 104 to be connected to base portion 102 for use as a laptop device and may enable the top portion 104 to be detached from base portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof.

In certain examples, a cover, such as a c-cover, of base portion 102 may be made from any suitable metal, such as aluminum. In an example, information handling system 100 may be any suitable design or configuration, such as a 3-knuckle design or a 5-knuckle design. These different designs or configurations may be similar except for differences in an x-dimension extension that occurs before the break for the hinge structure. In an example, antenna assemblies 130 and 132 may be wireless local area network (WLAN) antennas. In certain examples, antenna assemblies 130 and 132 may be formed in part by the edge structure of base portion 102 located near the rear corner as will be described herein. Antenna assemblies 130 and 132 may differ from each other, may slightly differ from each other, may be mirror images of each other, or the like.

In an example, antenna assemblies 130 and 132 may be mirror images such that features in one antenna assembly may have opposite dimensions as compared to the other antenna. For example, each antenna assembly 130 and 132 may include a parasitic resonator, such as parasitic resonator 220 in FIG. 2, that is formed in the rear corner of base portion 104. In this example, the parasitic resonators may be 'L' shaped and the direction of the 'L' for each of the resonators may be opposite of each other. The different direction of the parasitic resonators and primary resonators, such as resonator 220 and antenna 402 illustrated in FIG. 402, may create an omni-directional antenna configuration for information handling system 100. In an example, a portion 140 of information handling system 100 will be described with respect to FIG. 2 below.

Figure 2:
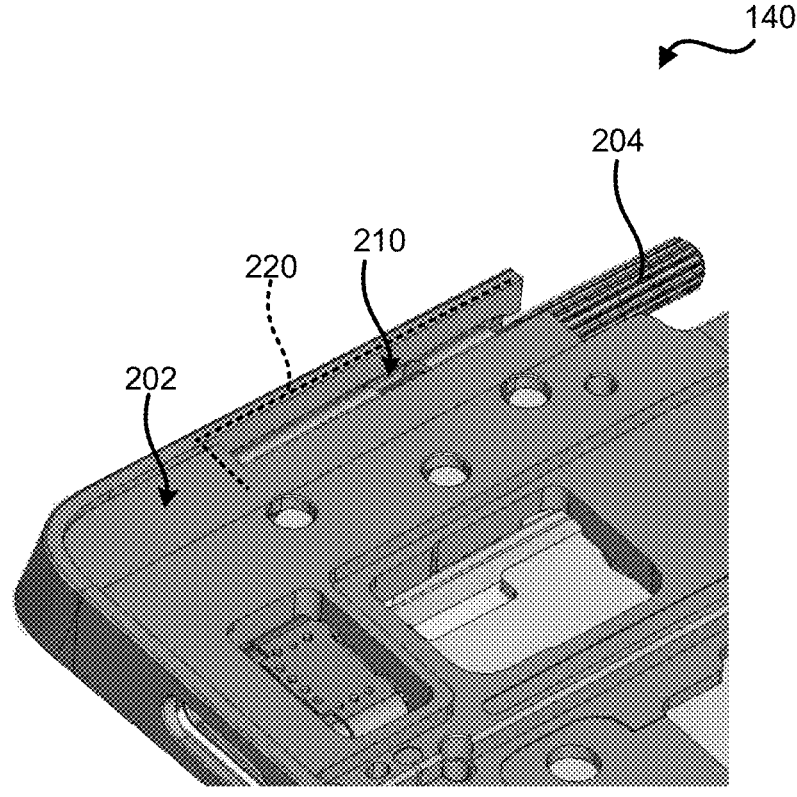
FIG. 2 is a perspective view of a portion of an information handling system according to at least one embodiment of the present disclosure.

FIG. 2 illustrates a perspective view of portion 140 in information handling system 100 in FIG. 1 according to at least one embodiment of the present disclosure. The information handling system includes a cover 202 and a hinge 204. In an example, cover 202 may be any suitable cover, such as a metal c-cover. For clarity and brevity, formation of a single antenna assembly will be described with respect to FIGS. 2-7, but the same structure may be applied to each of antenna assemblies 130 and 132 in information handling system 100 of FIG. 1. One difference between the antenna assemblies may be that the antennas are mirror images of each other.

In an example, a slot 210 may be cut in the rear corner frame of cover 202 as illustrated in FIG. 2. In certain examples, slot 210 may be substantially above portions of hinge 204. Information handling system 100 of FIG. 1 may include an inlay glass/plastic cover, such as frame cover 604 of FIG. 6, to hide hinge 204, slot 210 and other components within cover 202. In an example, slot 210 may create an 'L' shape 220 within the rear corner frame of cover 202. This L shape 220 may be utilized as a parasitic resonator for the antenna, such as antenna pattern 402. In an example, when L shape resonator 220 is excited, the resonator may resonate at a particular fundamental frequency. This fundamental frequency may be any suitable frequency, such as 2.4 GHz for a lower bandwidth of wireless fidelity (WiFi) and its harmonic frequencies may be utilized for part of the 5 GHz spectrum.

Figure 3:
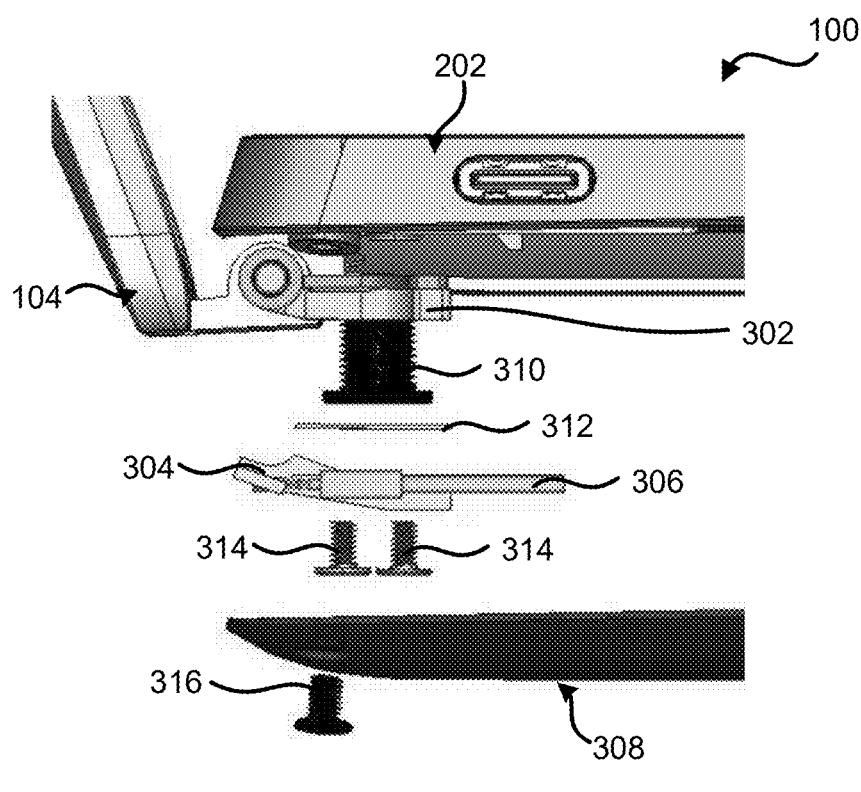
FIG. 3 is an exploded view of a portion of an information handling system according to at least one embodiment of the present disclosure.

FIG. 3 illustrates an exploded view of a portion of information handling system 100 according to at least one embodiment of the present disclosure. Information handling system 100 includes a hinge 302, an antenna holder 304, a radio frequency (RF) connection 306, a bottom cover 308, and cover 202. In an example, hinge 302 may be connected to cover 202 via one or more screws 310. In certain examples, RF connection 306 may be a cable or any other suitable component to provide RF signals to an antenna of information handling system 100. Information handling system 100 further includes a gasket/conductive fabric 312, antenna mounting screws 314 and bottom cover mounting screw 316. Information handling system 100 may include additional components without varying from the scope of this disclosure.

In an example, gasket/conductive fabric 312 may be in physical communication/contact with both hinge 302 and antenna holder 304. Based on the physical communication/contact of gasket 312 with both hinge 302 and antenna holder 304, the gasket may provide different functions or interfaces between the antenna in antenna holder 304 and hinge 302. For example, gasket/conductive fabric 312 may provide an electrical connection between the antenna in antenna holder 304 and hinge 302. In certain examples, hinge 302 may be utilized for RF signal excitation through a slot, such as slot 210 of FIG. 2, in cover 202. In an example, RF connection 306 may connect the antenna, such as antenna pattern 402 of FIG. 4, to the radio of information handling system 100.

Figure 4:
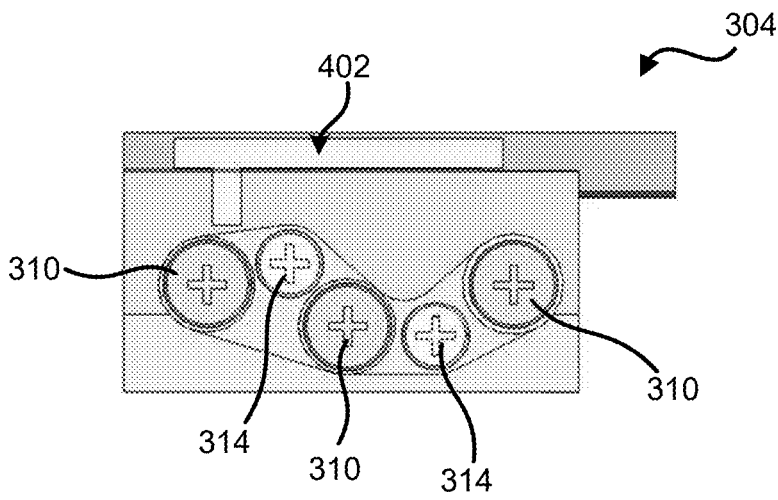
FIG. 4 is a diagram of an antenna holder for an information handling system according to an embodiment of the present disclosure.

FIG. 4 illustrates antenna holder 304 for information handling system 100 of FIGS. 1 and 2 according to an embodiment of the present disclosure. Antenna holder 304 includes an antenna pattern 402, which in turn may be any suitable resonating antenna. In an example, antenna pattern 402 may be formed on antenna holder 304 in any suitable manner, such as a laser direct structure (LDS), a metal component inserted into the plastic component of the antenna holder, or the like. When antenna pattern 402 is an LDS pattern, the conductive trace may be implemented directly on the plastic of antenna holder 304. In certain examples, antenna holder 304 may include multiple holes to allow hinge mounting screws 310 to extend through antenna holder 304. In an example, antenna 402 may be couple fed onto a parasitic resonator, such as resonator 220 of FIG. 2, to form a complete antenna for information handling system 100 of FIG. 1. In certain examples, the complete antenna may be a WiFi antenna or any other type of antenna needed for different uses in information handling system 100 of FIG. 1. As used herein, couple fed refers to one antenna or resonator being physically connected through one or more other components to another resonator of an antenna assembly.

Figure 5:
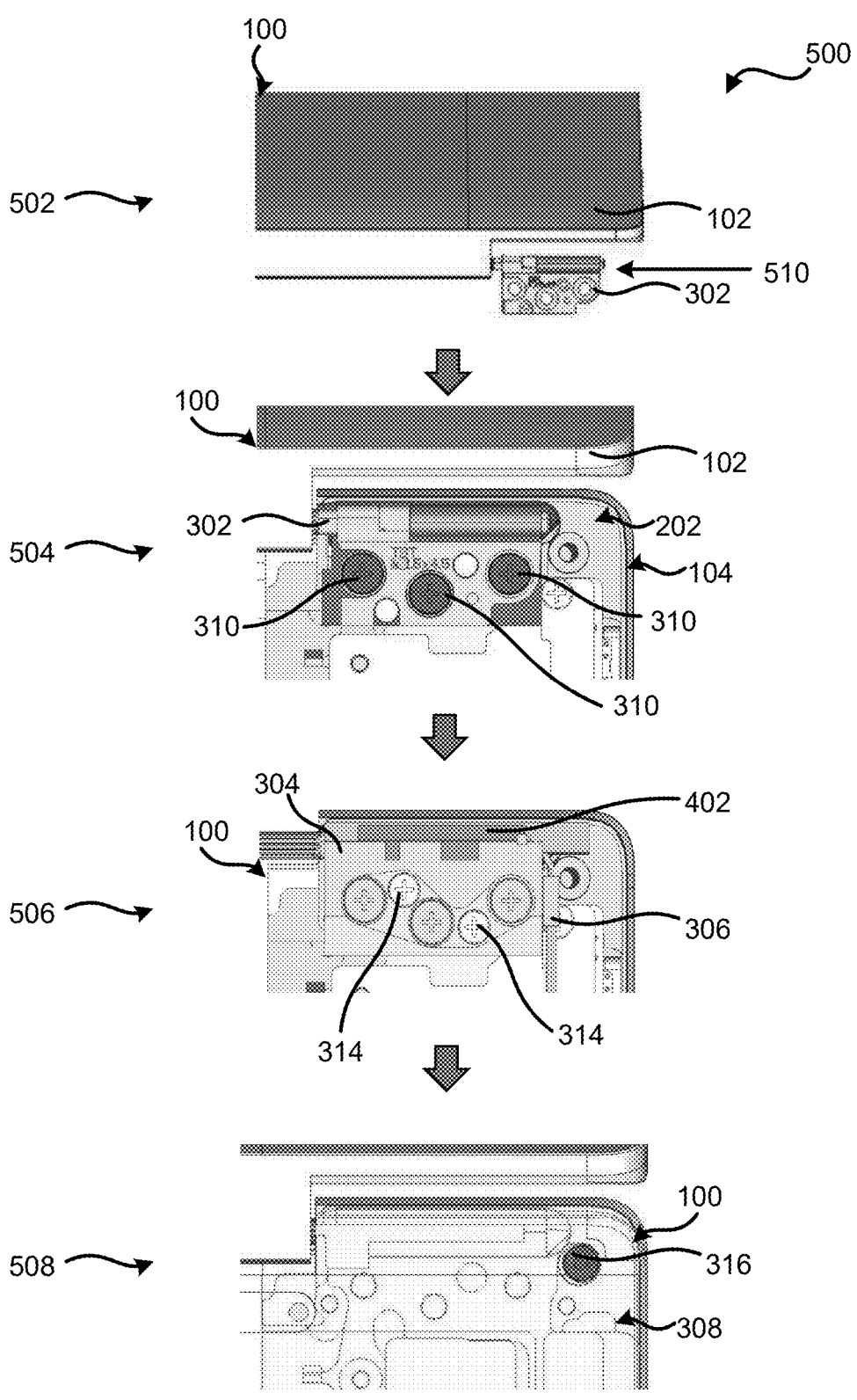
FIG. 5 is a diagram of a sequence of steps to attach an antenna holder in a corner of an information handling system according to an embodiment of the present disclosure.

FIG. 5 illustrates a sequence 500 of steps 502, 504, 506, and 508 to attach antenna holder 304 in a corner of information handling system 100 according to an embodiment of the present disclosure. At step 502, hinge 302 may be attached to top portion 102 of information handling system 100. In an example, hinge 302 may be pressed into top portion 102 in the direction of arrow 510.

At step 504, hinge 302 is attached to cover 202, such that top portion 102 and bottom portion 104 are connected together. In an example, hinge 302 is attached to cover 202 via hinge mounting screws 310. In this example, the metal hinge 302 may be attached to metal cover 202. At step 506, antenna holder 304 is attached to hinge 302. In an example, antenna holder 304 may be attached to hinge 302 via antenna mounting screws 314. At block 508, bottom cover 308 is attached to information handling system 100. In an example, bottom cover 308 may be attached via bottom cover mounting screw 316.

Figure 6:
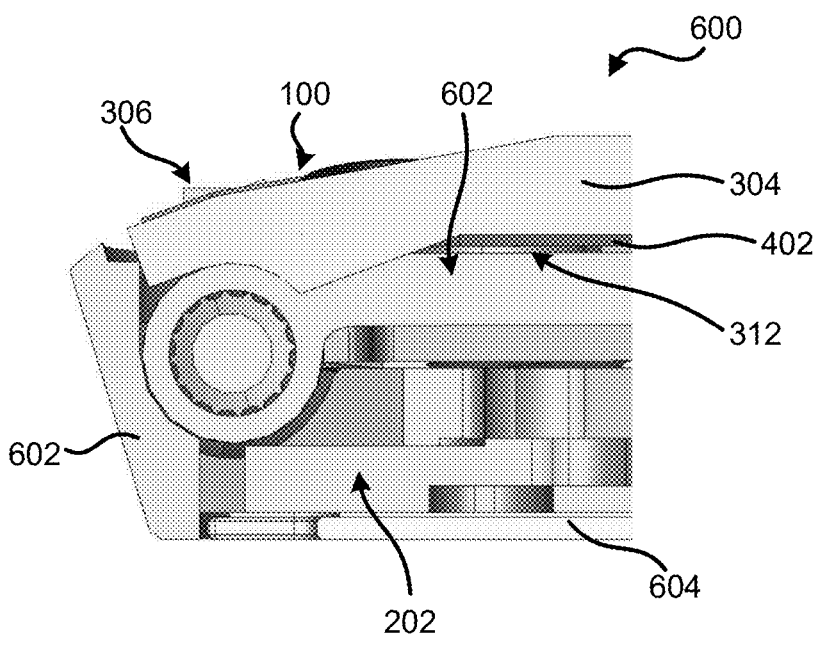
FIG. 6 is a cross sectional view of a portion of an information handling system according to an embodiment of the present disclosure.

FIG. 6 illustrates a cross section view of a portion 600 information handling system 100 according to an embodiment of the present disclosure. Information handling system 100 includes a metal frame 602 and frame cover 604. Information handling system 100 also includes cover 202 with slot 210, hinge 302, antenna holder 304, RF connection 306, gasket 312, and antenna 402. Information handling system 100 may include additional components without varying from the scope of this disclosure.

Figure 7:
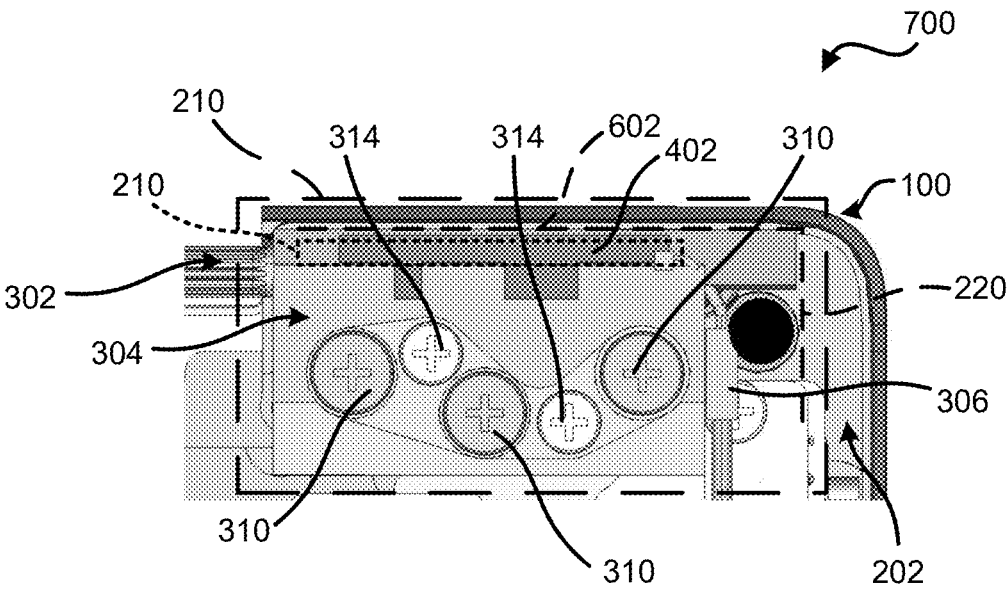
FIG. 7 is a bottom view of a portion of an information handling system according to an embodiment of the present disclosure.

In an example, the portion of metal frame 602 created by slot 210 may form resonator 220, shown in FIG. 7, which in turn may support antenna 402 for low band frequencies. As shown in FIG. 6, gasket 312 may be located in between and in physical communication with hinge 302 and antenna holder 304. Based on gasket 312 being a conductive fabric, hinge 302 may provide a conductive ground for antenna 402. In an example, antenna 402 may be a coupling pattern in a particular section of antenna holder 304, such as a x-section of the antenna holder.

FIG. 7 illustrates a bottom view of a portion 700 of information handling system 100 according to an embodiment of the present disclosure. Portion 700 illustrates hinge assembly 702 formed by antenna holder 304 being coupled to cover 202 via hinge 302. Based on antenna resonator 402 being attached to hinge 302 via antenna mounting screws 314 and antenna holder 304, the hinge may become part of the antenna. Additionally, based on hinge 302 being attached to the chassis via hinge mounting screws 310, antenna 402 may have a more effective grounding scheme, which in turn may minimize the parasitic capacitance induced through grounding in RF connection 306. In an example, the grounding of RF connection 306 may be a copper foil grounding. In certain examples, the grounding scheme of antenna 402 through hinge 302 and the chassis, may suppress noise originating from the motherboard or input/output (IO) ports of information handling system 100.

In an example, based on antenna 402 being located within a corner of cover 202, mechanical/location-based nulls in the radiation pattern for the antenna are minimized. In particular, prior information handling systems may have the antenna located in between hinges and these previous information handling systems had radiation pattern blockage from the hinges. However, information handling system 100 utilizes hinges 302 as additional grounding for antenna 402, such that these radiation pattern blockages as substantially minimized as compared to previous information handling systems. Additionally, the location of and grounding through hinge 302 for antenna 402 may minimize radiation pattern blockage/interference issues from the user as compared to previous information handling systems. Antenna assemblies 130 and 132 of information handling system 100 in FIG. 1, may have higher maximum power levels for specific absorption rate (SAR) measurements as compared to previous information handling systems.

In certain examples, excitation resonator antenna 402 may be utilized for higher frequencies, such as 5~6 GHZ, and the portion of metal frame 602 that forms resonator 220 may support a lower bandwidth frequency, such as 2.4 GHz. In these examples, the combination of antenna 402 and resonator 220 may support a wide range of WiFi supporting bands, such as 2.4 GHz, 5 GHZ, and 6 GHz. As described herein excitation resonator 402 is assembled onto hinge mechanical structure 302 such that when the hinge assembly is screwed into housing 202, the resonator antenna assembly couples to parasitic resonator 402 to complete the entire antenna solution for information handling system 100. Additionally, the combination of excitation antenna 402 with hinge 302 may create a higher assembly accuracy and repeatability as compared to antenna assemblies in previous information handling systems.

Figure 8:
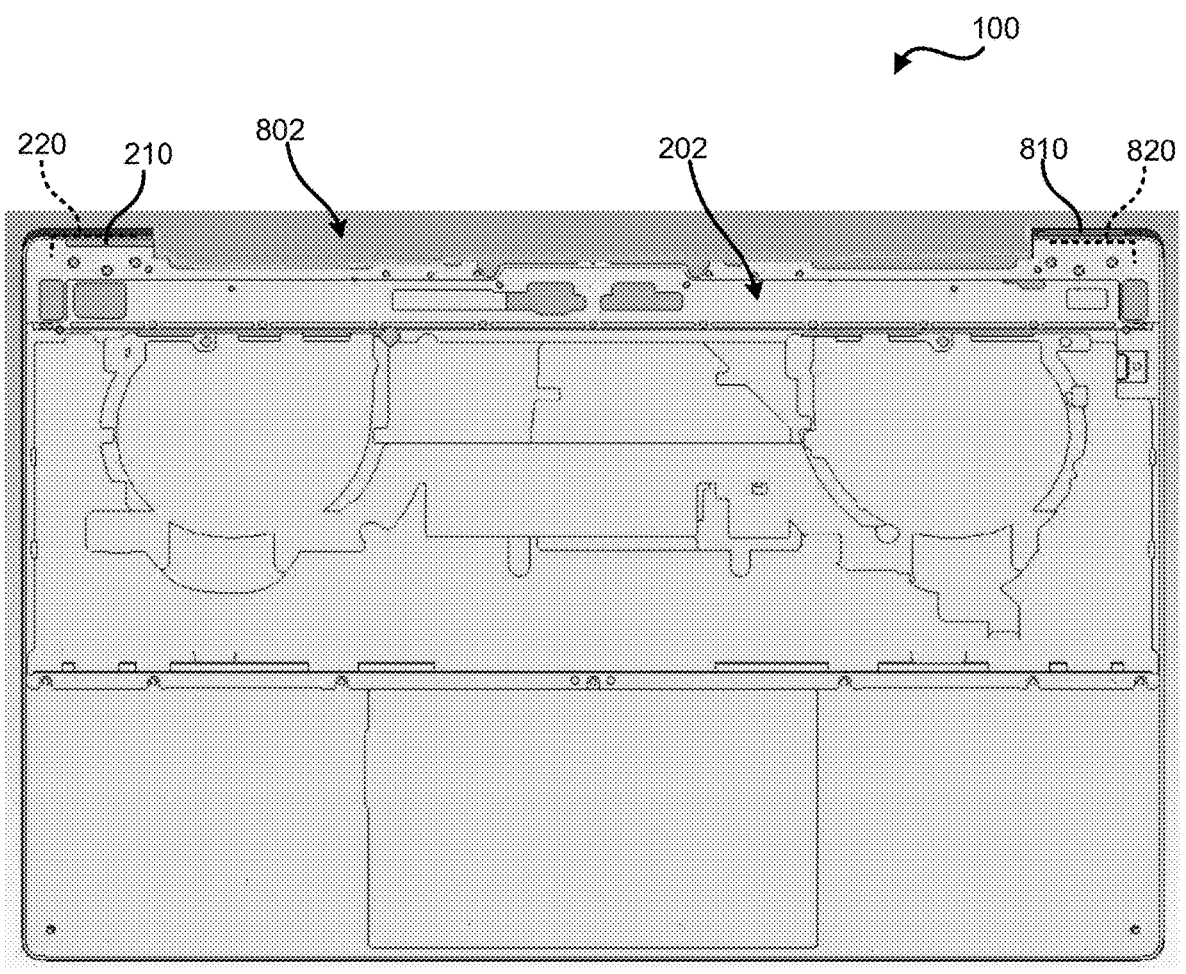
FIG. 8 is a diagram of a cover of an information handling system according to an embodiment of the present disclosure.

FIG. 8 illustrates cover 202 of information handling system 100 according to an embodiment of the present disclosure. Cover 202 includes a notch 802, and slots 810 and 210. Notch 802 may be located within a back edge of information handling system 100, and extend between the hinges in both rear corners of the information handling system. In an example, slots 210 and 810 may create respective 'L' shapes 220 and 820 within the different rear corner frames of cover 202. These L shapes 220 and 820 may be utilized as parasitic resonators for the antennas. As illustrated in FIG. 8, the open end of slot 210 faces notch 802. Similarly, the open end of slot 810 faces notch 802. In an example, the RF signal excitation of the parasitic resonators may travel through slots 210 and 810 and out of information handling system 100 via notch 802.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a cover including a first parasitic resonator at a first corner of the cover, wherein the first parasitic resonator is configured to resonate at lower frequencies of a wireless fidelity frequency range;
   a hinge in physical communication with the cover, wherein the hinge is connected at the first corner of the cover; and
   an antenna holder in physical communication with the hinge, the antenna holder including a resonator antenna that is configured to resonate at higher frequencies of the wireless fidelity frequency range.

2. The information handling system of claim 1, further comprising a gasket in between the antenna holder and the hinge, wherein the gasket provides an electrical connection between the resonator antenna and the hinge.

3. The information handling system of claim 2, wherein the hinge is a conductive ground for the resonator antenna.

4. The information handling system of claim 3, further comprising a radio frequency connection in physical communication with the resonator antenna, wherein the radio frequency connection provides a ground to the resonator antenna.

5. The information handling system of claim 1, wherein the first parasitic resonator is formed from a slot in the cover, wherein the slot is located above the resonator antenna in the antenna holder.

6. The information handling system of claim 1, wherein the cover further includes a second parasitic resonator at a second corner of the cover, wherein the second parasitic resonator is configured to resonate at the lower frequencies of a wireless fidelity frequency range.

7. The information handling system of claim 6, wherein a first shape of the first parasitic resonator is a mirror image of a second shape of the second parasitic resonator.

8. The information handling system of claim 1, wherein the resonator antenna is a laser direct structure on the antenna holder.

9. The information handling system of claim 1, wherein the first parasitic resonator and the resonator antenna combine to form an antenna assembly.

10. An information handling system comprising:
a cover including a first parasitic resonator at a first corner of the cover, wherein the first parasitic resonator is formed from a slot in the cover located above a resonator antenna, wherein the first parasitic resonator is configured to resonate at lower frequencies of a wireless fidelity frequency range;
a frame cover in physical communication with the cover, wherein the slot is below the frame cover;
a hinge in physical communication with the cover, wherein the hinge is connected at the first corner of the cover; and
an antenna holder in physical communication with the hinge, the antenna holder including the resonator antenna configured to resonate at higher frequencies of the wireless fidelity frequency range.

11. The information handling system of claim 10, further comprising a gasket in between the antenna holder and the hinge, wherein the gasket provides an electrical connection between the resonator antenna and the hinge.

12. The information handling system of claim 11, wherein the hinge is a conductive ground for the resonator antenna.

13. The information handling system of claim 12, further comprising a radio frequency connection in physical communication with the resonator antenna, wherein the radio frequency connection provides a ground to the resonator antenna.

14. The information handling system of claim 10, wherein the cover further includes a second parasitic resonator at a second corner of the cover, wherein the second parasitic resonator is configured to resonate at the lower frequencies of a wireless fidelity frequency range.

15. The information handling system of claim 14, wherein a first shape of the first parasitic resonator is a mirror image of a second shape of the second parasitic resonator.

16. The information handling system of claim 10, wherein the resonator antenna is a laser direct structure on the antenna holder.

17. The information handling system of claim 10, wherein the first parasitic resonator and the resonator antenna combine to form an antenna assembly.

18. An information handling system comprising:
a cover including:
a notch in a rear edge of the cover;
a slot in a first corner of the cover, wherein an opening of the slot faces the notch in the rear edge; and
a first parasitic resonator at a first corner of the cover, wherein the first parasitic resonator is formed from the slot located above a resonator antenna, wherein the first parasitic resonator is configured to resonate at lower frequencies of a wireless fidelity frequency range;
a frame cover in physical communication with the cover, wherein the slot is below the frame cover;
a hinge in physical communication with the cover, wherein the hinge is connected at the first corner of the cover; and
an antenna holder in physical communication with the hinge, the antenna holder including the resonator antenna configured to resonate at higher frequencies of the wireless fidelity frequency range.

19. The information handling system of claim 18, further comprising a gasket in between the antenna holder and the hinge, wherein the gasket provides an electrical connection between the resonator antenna and the hinge.

20. The information handling system of claim 19, wherein the hinge is a conductive ground for the resonator antenna.

* * * * *